US012423741B2

(12) United States Patent
Ravuru

(10) Patent No.: US 12,423,741 B2
(45) Date of Patent: Sep. 23, 2025

(54) COORDINATED PROCESSING OF FOOD ORDERING BASED ON MEDIA CONTENT PRESENTATION

(71) Applicant: Roku, Inc., San Jose, CA (US)

(72) Inventor: Rakesh Ravuru, San Jose, CA (US)

(73) Assignee: Roku, Inc., San Jose, CA (US)

( * ) Notice: Subject to any disclaimer, the term of this patent is extended or adjusted under 35 U.S.C. 154(b) by 390 days.

(21) Appl. No.: 17/586,499

(22) Filed: Jan. 27, 2022

(65) Prior Publication Data

US 2023/0237561 A1 Jul. 27, 2023

(51) Int. Cl.
*G06Q 30/0601* (2023.01)
(52) U.S. Cl.
CPC ................. *G06Q 30/0641* (2013.01)
(58) Field of Classification Search
CPC ............. G06Q 30/0641; G06Q 10/083; G06Q 30/0633; G06Q 10/08; G06Q 10/0836; H04F 21/47815
See application file for complete search history.

(56) References Cited

U.S. PATENT DOCUMENTS

| | | | |
|---|---|---|---|
| 10,068,272 B1* | 9/2018 | Varma ................. | G06Q 30/0633 |
| 10,154,319 B1* | 12/2018 | Ramakrishnan ..... | H04N 21/278 |
| 2011/0082773 A1* | 4/2011 | Potter ................ | G06Q 30/0641 |
| | | | 715/810 |
| 2015/0302347 A1* | 10/2015 | Fredette ................. | G06Q 50/12 |
| | | | 705/15 |
| 2019/0087777 A1* | 3/2019 | Turner ............... | G06Q 10/0836 |
| 2020/0162771 A1* | 5/2020 | Janugani .......... | H04N 21/41265 |
| 2020/0204866 A1 | 6/2020 | Burbank et al. | |
| 2022/0319119 A1* | 10/2022 | Bhogale ............... | G06Q 10/083 |

OTHER PUBLICATIONS

Pessemier, T., Proposed architecture and algorithm for personalized advertising on iDTV and mobile devices, May 1, 2008, IEEE Transactions on Consumer Electronics, vol. 54, issue 2, pp. 709-713 (Year: 2008).*

* cited by examiner

*Primary Examiner* — Kelly S. Campen
*Assistant Examiner* — Timothy J Kang
(74) *Attorney, Agent, or Firm* — McDonnell Boehnen Hulbert & Berghoff LLP

(57) ABSTRACT

A method and system for food-order processing based on timing of media-content presentation. An example method includes a media presentation system detecting an occurrence of a media-presentation event associated with presentation of a media-content item by the media presentation system. Further, the example method includes, responsive to detecting the media-presentation event, (i) the media presentation system presenting a food-ordering prompt that solicits user input to place a food order, (ii) the media presentation system receiving the user input responsive to the presented prompt, and (iii) responsive to the received user input, the media presentation system engaging in network communication to place the food order pursuant to the received user input. And still further, the example method includes the media presentation system using timing of presentation of the media-content item as a basis to schedule a pickup or delivery time for the food order.

20 Claims, 7 Drawing Sheets

COORDINATED PROCESSING OF FOOD ORDERING BASED ON MEDIA CONTENT PRESENTATION

BACKGROUND

A typical media presentation system operates to facilitate presentation of media content, such as video, audio, or multi-media content, to end users. An example of such a system could include client-side equipment positioned at customer premises and arranged to output and present media content on a user interface such as a display screen with an associated sound system, and server-side equipment arranged to serve media content to the client-side equipment for presentation.

By way of example, the client-side equipment could include a media presentation device such as a television (TV), monitor, tablet computer, or mobile phone, which could present the media content on a user interface. Further, the client-side equipment could include a media player such as an over-the-top (OTT) streaming media player, cable or satellite set top box, digital video recorder, disc player, gaming system, mobile phone, personal computer, audio/video receiver, or tuner, which could be integrated with or in local or network communication with the media presentation device and could output media content to the media presentation device for presentation on the user interface. And the server-side equipment could include a media server and/or head-end equipment, operated by an OTT provider (e.g., virtual multichannel video programming distributor (virtual MVPD)), cable or satellite TV provider, or the like, which could stream or otherwise deliver media content to the client-side equipment for presentation.

In operation, a user at the customer premises may control the client-side equipment, to cause the system to present a desired media-content item, such as a movie, TV show, or video game, among other possibilities, any of which might be locally-stored, broadcast, or on-demand, also among other possibilities. For instance, the media presentation system may present the user with an on-screen media-content selection menu, and the user may operate a remote control to navigate through that menu, to select a desired media-content item, and to direct the system to present the selected media-content item. In response, possibly through interaction between the client-side equipment and the server-side equipment, the client-side equipment could obtain and present the selected media-content item to the user. And the user may then enjoy presentation of that selected media-content item.

SUMMARY

When a user watches media content, the user may also wish to order food from a restaurant or other food vendor, to eat while the user is watching the media content or to eat at a break in the media content or soon after presentation of the media content ends. For instance, the user may wish to order a snack to eat while watching the media content. Or if the user is watching a movie or TV show around dinner time, the user may wish to order dinner to be delivered or picked up soon after the movie or TV show ends. Other examples could be possible as well.

The present disclosure provides a technical advance to help facilitate such food ordering in a manner that leverages information that the media presentation system possess about media content presentation to the user. In particular, the disclosure provides a method and system for programmatically interrelating media content presentation with food order processing.

In accordance with the disclosure, the media presentation system could use the subject matter and/or timing of presentation of media content, such as a movie, TV show, or video game, as a basis to control various aspects of a food ordering and conveying process. For instance, the system could use the subject matter of the media content as a basis to select one or more food-ordering options, and the system could then prompt a user to place an associated food order through the system. Further, the system could use timing of presentation of the media content as a basis to control timing of the conveying (e.g., delivery or pickup) of the ordered food, timing of associated prompts or notifications, and/or other aspects of the process.

According to the disclosure, the media presentation system could determine one or more characteristics of a media-content item that the media presentation system is about to present or is presenting, such as a subject matter of the media-content item, and the media presentation system could use the determined media-content characteristic(s) as a basis to determine one or more associated food-ordering options such as nearby restaurants and restaurant-menu items.

Further, the media presentation system could programmatically control timing and substance of various aspects of this process based on timing of presentation of the media-content item.

For example, the media presentation system could automatically present the food-ordering prompt in response to a determination that presentation of the media-content item will soon begin, such as in response to the media presentation system currently presenting a startup prompt for playout of the media-content item. Or the media presentation device could automatically time presentation of the food-ordering prompt to occur at an opportune time during presentation of the media-content item, based on consideration of content of the media-content item, such as when a logical breakpoint will occur in the media-content item.

As yet another example, the media presentation system could schedule delivery or pickup of the ordered food to occur at an opportune time in relation to presentation of the media-content item, also taking into account travel time and/or other such factors where appropriate, such as upon conclusion of the media-content item or at an optimal breakpoint during presentation of the media-content item.

Further, the media presentation system could time its presentation of the food-ordering prompt in the first place based on how long it may take for ordered food to be ready and based on timing of presentation of the media-content item, such as by presenting the food-ordering prompt sufficiently before a time when the user would likely want to eat in relation to timing of the media-content item, taking into account various factors, such as likely preparation time at each of various potential food vendors for instance.

Yet further, the media presentation system could tailor what food-ordering options the media presentation system includes in the food-ordering prompt, based on a prediction of which food-ordering options would be available for pickup or delivery by the eating time determined in relation to presentation of the media-content item, also possibly accounting for travel time for delivery or pickup.

These as well as other aspects, advantages, and alternatives will become apparent to those of ordinary skill in the art by reading the following detailed description, with reference where appropriate to the accompanying drawings.

DETAILED DESCRIPTION

The present disclosure will focus on an example implementation in the context of an OTT media presentation system, in which a virtual MVPD streams media content such as various OTT channels on demand to a media player at customer premises and the media player outputs the media content for presentation on a TV or other multi-media user interface. It should be understood, however, that the disclosed principles could extend to apply in other scenarios as well. For instance, the disclosed principles could apply with respect to a cable or satellite TV content feed, a video gaming system, a standalone client-based media player, and other arrangements.

Figure 1:
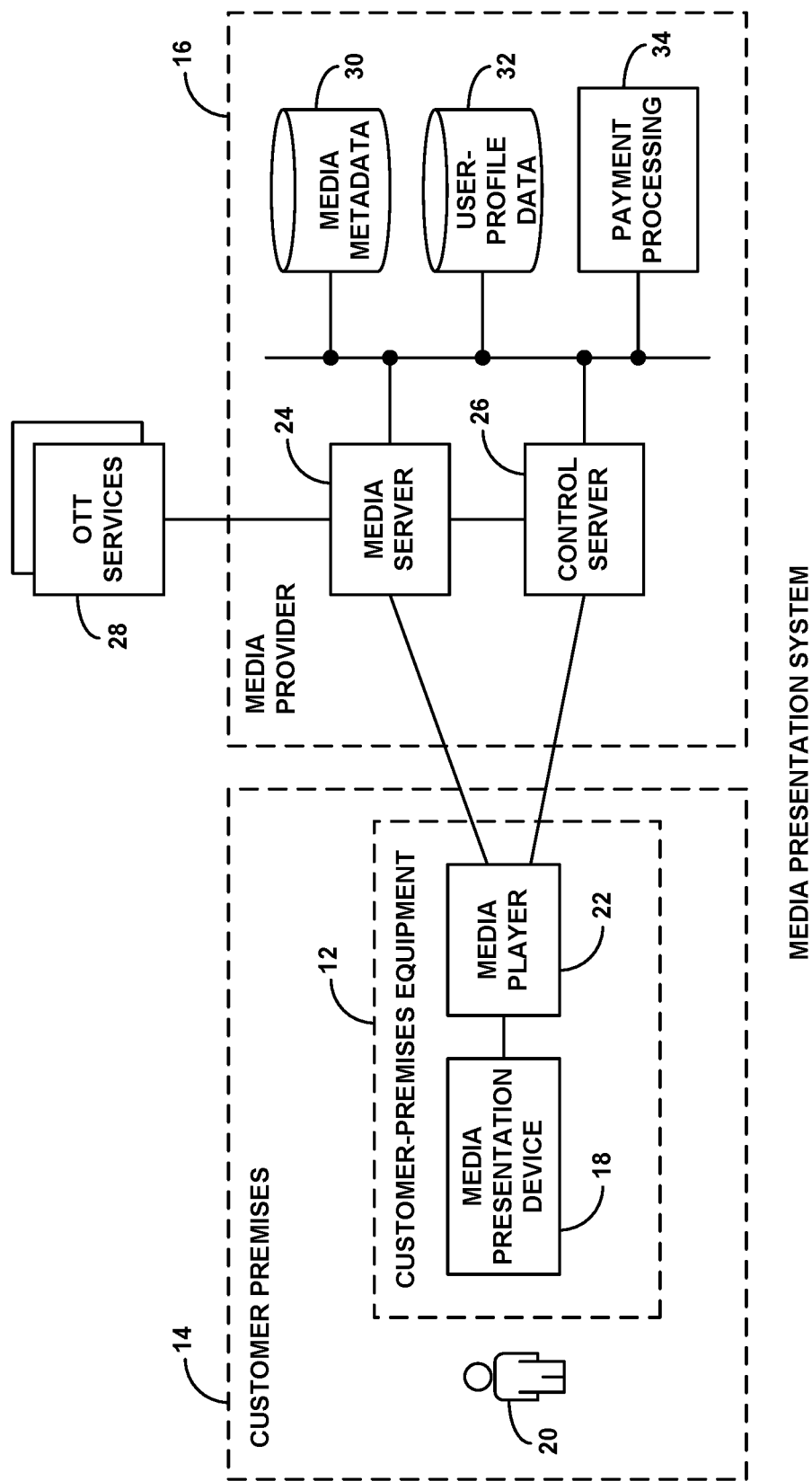
FIG. 1 is a simplified block diagram of an example media presentation system.

Referring to the drawings, FIG. 1 is a simplified block diagram of an example media presentation system. In line with the discussion above, the example media presentation system includes customer-premises equipment 12 located at customer premises 14 such as a home, and a network based media provider 16 configured to provide the customer-premises equipment 12 with media content for presentation.

In the example arrangement, the customer-premises equipment 12 includes a media presentation device 18 such a TV or other user-interface device configured to present media content to one or more users such as example user 20. Further, the customer-premises equipment 12 includes a media player 22, such as an OTT device, configured to receive streaming media content and to provide the media content to the media presentation device 18 for presentation. In various implementations, the media player 22 could be provided as a standalone device connected with the media presentation device 18 by a High Definition Multimedia Interface (HDMI) cable or other wired or wireless connection or could be integrated within the media presentation device 18 or provided in another manner.

The example network-based media provider 16 then includes a media server 24 configured to stream media content on demand to user devices such as customer-premises equipment 12 and includes a control server 26 configured to control the streaming. The media provider 16 could be configured to obtain much of this content on demand from various OTT services 28 and to serve or proxy that media content to the customer-premises equipment for presentation.

In an example implementation, the media player 22 could be in network communication with both the media server 24 and control server 26, to facilitate interacting with the media provider 16 to receive information about available media content, and to request and receive streaming media content for presentation on media presentation device 18. For instance, the media player 22 have local area network (LAN) connectivity at the customer premises 14, the customer premises 14 could have a router and modem (not shown) with an assigned public Internet Protocol (IP) address on the Internet, and the media server 24 and control server 26 could be accessible at respective public IP addresses as well. Alternatively, the media player 22 could have virtual private network (VPN) connectivity with the media server 24 and control server 26, among other possibilities.

Streaming of media content from the media server 24 to the media player 22 could operate according to any of a variety of well-known adaptive bit-rate streaming protocols, such as Dynamic Adaptive Streaming over Hypertext Transfer Protocol (HTTP) (DASH), HTTP Live Streaming (HLS), or Smooth Streaming Transport Protocol (SSTP), among other possibilities. As the details of these streaming protocols are known, they will not be described here.

In the example implementation, the media provider 16 could include or otherwise have access to various data and platforms to facilitate providing streaming media services to users such as user 20. As shown, for instance, the media provider 16 could have access to media metadata 30, user profile data 32, and a payment processing system 34. The media metadata 30 could include a variety of information regarding each of various media-content items available for streaming, such title, duration, genre, production staff, menu graphics, and ratings, among other possibilities. The user profile data 32 could include profile records for users and associated customer-premises equipment configured to receive streaming media service provided by the media provider 16, such as user name, equipment location, user-payment information (e.g., credit card information), and mobile phone number if applicable. And the payment processing system 34 could be configured to securely interact with a commercial payment processing platform (e.g., a credit-card service) (not shown) and with a user such as user 20, to enable the media provider 16 to process user payments for media streaming and/or other services.

As noted above, the media presentation system could be configured to present the user 20 with an on-screen media-content selection menu, and the user could operate a remote control (not shown) to navigate through that menu and interact with various on-screen prompts in order to select a desired media-content item to be presented and to direct the system to present that selected item. In practice, for instance, the control server 26 could serve the media player 22 with graphical user interfaces (GUIs) representing various menu screens and prompts, and the media player 22 could responsively output the GUIs for presentation by the media presentation device 18. The control server 26 could establish these GUIs based on the media metadata 30 and user profile data 32, such as restricting the GUIs to present information about media content that is available for streaming to the user 20. And the control server 26 could receive user input entered into media player 22 and could respond to the user input by generating and transmitting other GUIs to the media player 22 for presentation.

Figure 2:
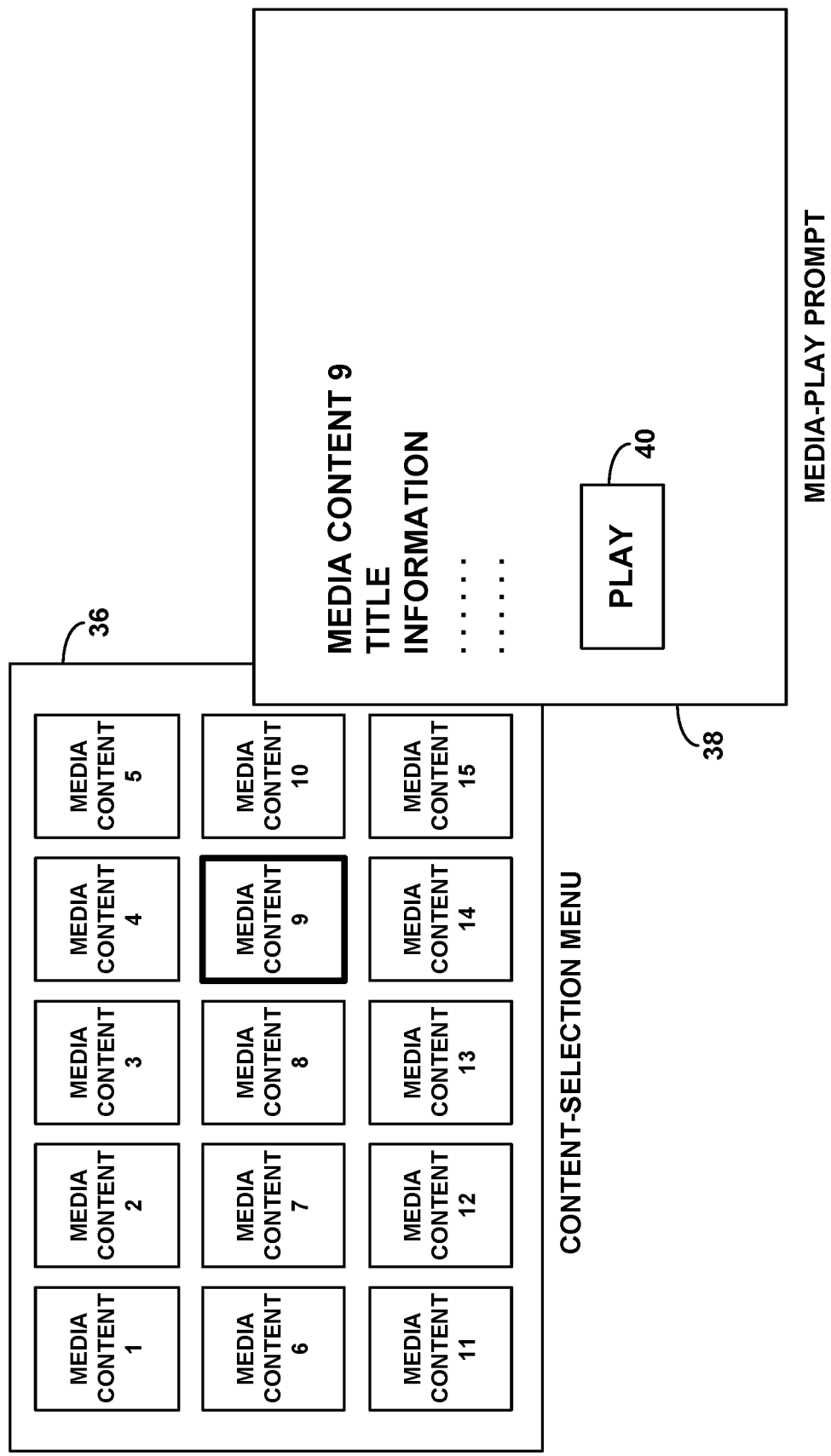
FIG. 2 is a simplified illustration of example graphical user interfaces (GUIs) that could be presented.

FIG. 2 is a simplified illustration of two example GUIs that the media presentation system may present to the user in an example implementation. In particular, the figure illustrates a content-selection GUI 36 and a media-play-prompt GUI 38. The user might reach the content-selection GUI 36 by first navigating through a channel-selection GUI (not shown) that lists various OTT channels available through the media provider 16. And the content-selection GUI 36 could then provide an array of thumbnails of various media-content items available for streaming, illustrated for simplicity in the figure as media-content items 1 through 15. Further, the figure illustrates a particular media-content item, item #9, being in focus as a result of user navigation to that item. Upon user selection of that item, the media presentation system could then turn to present the media-play-prompt GUI 38, which provides the user with information about the selected media-content item and includes a PLAY button 40 that the user could invoke to start streaming and presentation of that media-content item. Thus, upon user selection of that PLAY button 40, the media presentation system could then stream media-content item #9 to media player 22, and media player 22 could output content of that item for presentation by media presentation device 18.

As the user 20 interacts with the media presentation system and as the media presentation system presents media to the user, the control server 26 may possess information about the state of that interaction and presentation. For instance, the control server 26 may maintain a context record for the media player 22 and update the context record as the state of the user's interaction and the media-content presentation changes over time.

By way of example, as the user interacts with an on-screen content-selection menu or the like, the media player 22 may signal to the control server 26 when certain user-interface events occur, such as when the user has navigated to a particular media-content item, when the user has navigated to a startup prompt for a particular media-content item, or when the user has reached another point or provided other input in relation to media content selection. And the control server may responsively update the user context record to indicate the state of the user's interaction with the system.

Likewise, when the media player 22 is receiving and outputting a given media-content item for presentation by the media presentation device 18, the media server 24 and control server 26 may cooperatively possess information indicating the state of streaming of that media-content item to the media player 22, such as timestamps or other data that indicate streamed duration and remaining streaming duration of the media-content item. If the media player 22 outputs for presentation the media content as media server 24 streams the media content to the media player, this information could thus indicate and inform the control server 26 of the state of presentation of the media content at the customer premises. Further, the media player 22 could provide to the control server 26, and the control server 26 could thus additionally possess, information indicating changes in streaming and presentation state such as pausing, fast-forwarding, or the like, among other possibilities. And the control server could similarly update the user context record to indicate this or other state information as well.

As discussed above, the present disclosure provides for interrelating media content presentation with food order processing. To facilitate this, in an example implementation, the media provider 16 could be configured to interact with a food vendor system and to make food options available for ordering by users at customer premises, and the media provider 16 could optimally take into account various aspects of the media-presentation process as basis to coordinate various aspects of the food-ordering process.

Figure 3:
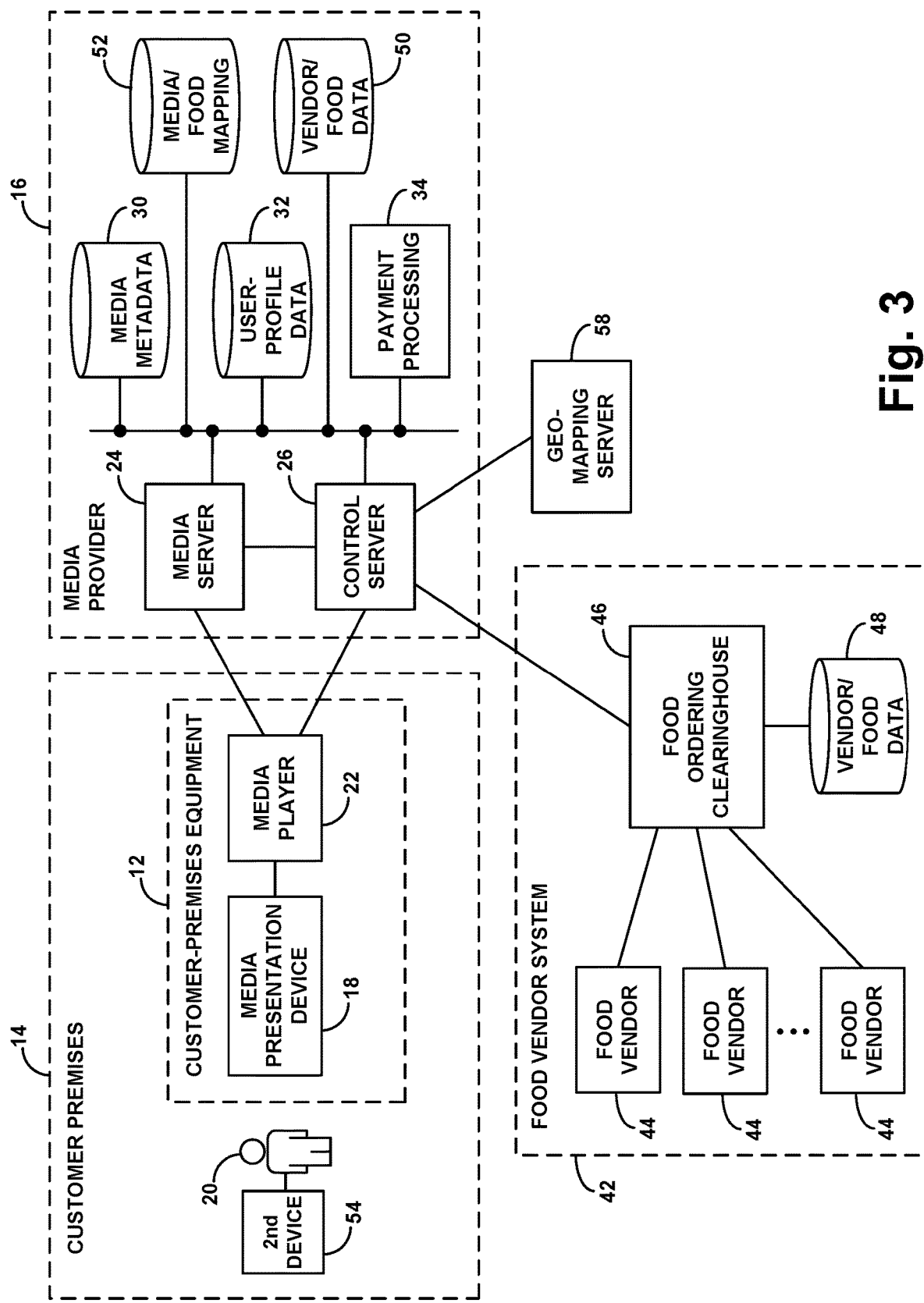
FIG. 3 is a simplified block diagram of an example system including the media presentation system of FIG. 1 and further including a food vendor system.

FIG. 3 illustrates an example system configured to facilitate the disclosed operations. The example system includes a media presentation system with components corresponding to those shown in FIG. 1. In the example system, however, the media presentation system is also in communication with an example food vendor system 42 that is configured to receive and process orders for food delivery or pickup with respect to one or more food vendors. With this or another such arrangement, the media presentation system could optimally make use of the information that it possesses regarding presentation of media content to user 20, as a basis to coordinate placement of food orders on behalf of the user.

In the arrangement shown, the example food vendor system 42 includes a number of food vendors 44, such as restaurants, snack shops, grocery stores, or the like, each of which supports food orders placed through an online ordering process for pickup or delivery. Further, the example food vendor system 42 includes a food-ordering clearinghouse 46 that functions as a proxy or other interface between the food vendors 44 and entities that would place food orders. In an example implementation, for instance, the food-ordering clearinghouse 46 could comprise a server that engages in signaling communication respectively with each food vendor 44 and provides a normalized application programming interface (API) through which entities could place food orders for food from any available vendors.

In the example implementation, the food-ordering clearinghouse 46 could include or have access to vendor/food data 48 that provides information about each of the various food vendors 44 and their available food, to facilitate food ordering. By way of example, this information could include for each vendor a name and logo of the vendor, location and hours of the vendor, whether the vendor provides delivery service, classification of vendor food type (e.g., if a particular ethnic, regional, or other type of food), names of food items available for ordering from the vendor, and per-food-item information such as pricing, preparation time, ingredients, options, and classification of food type, etc. Further, the information could include, per vendor, various additional information that could relate to or establish how long it may take for the vendor to process food orders, such as a measure of how busy the vendor is currently, how long it may take before a delivery driver could depart from the vendor, and the like.

In practice, the media provider 16 could have real-time access to this or associated vendor/food data to facilitate performing various disclosed operations. For instance, the control server 26 could subscribe to receive updates of the vendor/food data from the food-ordering clearinghouse 46 whenever changes to that information occur, and the control server 26 could maintain its own record of that information as vendor/food data 50 accessible to the control server 26.

An arrangement such as that shown in FIG. 3 could optimally enable a media presentation system and/or one or more associated systems to use the subject matter and/or timing of presentation of media content to user 20 as a basis to control various aspects of food ordering for the user.

In operation, for instance, the media presentation system could determine one or more characteristics of a media-content item that a media presentation system is presenting or about to present to the user, and the media presentation system could use the determined media-content characteristic(s) as a basis to determine one or more associated food-ordering options such as one or more nearby food vendors and one or more food items available for ordering from each such vendor. For instance, the media presentation system could correlate a genre, theme, or other subject matter of the media-content item to corresponding food-vendor options—such as correlating an Italian-themed movie to Italian restaurants or the like, or correlating a children's television show to kids meal options.

To facilitate this, the media provider 16 could further include or otherwise have access to media/food mapping (i.e., correlation) data 52 that correlates various subject-matter classes or characteristics of media-content items to respective classes or characteristics of food items. For instance, the media/food mapping data 52 may correlate Italian-themed media content to the class of Italian food, children's media content to the class of child-friendly food, and horror-themed media content to the class of spicy food, among other possibilities.

When the media presentation system is presenting or about to present a particular media-content item to the user 20, the control server 26 could then determine from media metadata 30 and/or the user context record one or more characteristics of the media-content item, the control server 26 could then use the media/food mapping data 52 as a basis to determine one or more food characteristics corresponding with the determined one or more media-content characteristics, and the control server 26 could then refer to the vendor/food data 50 to identify a set of available food vendors and/or specific food items that match one or more of the determined food characteristics. In practice, the control server may carry out this multi-faceted process with a single relational-database query or in another manner.

Once the media presentation system has established a set of one or more food options (e.g., vendors and/or specific food items available from particular vendors) based on one or more characteristics of the media-item at issue and/or based on one or more other factors, the media presentation system could optimally present to the user 20 a prompt that lists some or all of the food options of the established set and specifies various information respectively per food item, such as pricing information, ingredients, options for pickup or delivery, etc. For instance, the control server 26 could generate and provide to the user a food-ordering prompt that specifies various such food options and enables the user to select one or more food items to order for pickup or delivery.

The control server 26 could provide such a food-ordering prompt to the user in various ways. By way of example, the control server 26 could generate and provide to the media player 22 a food-ordering-prompt GUI with graphical elements and text defining the food-ordering prompt, and the media player 22 could output that food-ordering-prompt GUI for presentation by the media presentation device, perhaps as a pop-up dialog superimposed over or integrated with various other content (e.g., media-content or content-selection-menu) currently being presented to the user. Alternatively, if the user operates a second device 54 such as a mobile phone or tablet computer, the control server 26 may generate and send the food-ordering prompt as a message targeted to that second device, such as a text message or multimedia-messaging-service message to the user's mobile phone, which the second device may similarly present to the user.

The user may then review the presented food-ordering prompt and responsively select one or more listed food items to order and provide user input indicating that selection. And data representing the user input could then flow in turn to the control server 26 for processing of the user's food order.

Thus, responsive to providing the food-ordering prompt, media presentation system could receive user input selecting one or more desired food options, and the media presentation system could then process the user's food order.

To process the user's food order in an example implementation, the control server 26 could engage in signaling communication with the food-ordering clearinghouse 46. For instance, the control server could make use of the API provided by food-ordering clearinghouse 46. Using that API, the control server may specify the user's name and contact information for the food-order, the food vendor from which food is to be ordered, the food item(s) being ordered including any associated options, an indication of whether the order is for pickup or delivery, and a time for pickup or delivery of the food, among other information. And the food-ordering clearinghouse 46 may forward that order to the indicated food vendor to trigger fulfillment of the food order.

The control server 26 could manage user payment for this food order in various ways as well. For instance, the control server 26 could make use of the media provider's payment processing system 34 and the user's payment information. In particular, the control server 26 could refer to the user-profile data 32 to obtain the user's payment information or could receive the user's payment information through the food-ordering prompt GUI 56, and the control server 26 could then provide that payment information to the payment processing system 34 to process payment from the user to the media provider 16 for the food order. The control server 26 could then use the API of the food-ordering clearinghouse 46 to submit associated payment from the media provider 16 to the food-ordering clearinghouse, to facilitate payment to the food vendor, or the media provider 16 could maintain an account with the food-ordering clearinghouse 46 for all such food orders on a periodic basis or the like. Alternatively, the control server 26 could forward the user's payment information to the food-ordering clearinghouse 46 to facilitate payment for the food order.

Further, as discussed above, the media presentation system could programmatically control timing and substance of various aspects of this process based on timing of or related to presentation of the media-content item at issue.

By way of example, as indicated above, the media presentation system could automatically present the food-ordering prompt in response to a determination that presentation of the media-content item will soon begin, such as when the media presentation system is presenting a startup prompt for the media-content item. For instance, the media presentation system could present the food-ordering prompt in response to the media player 22 presenting the media-play prompt GUI 38 discussed above.

Figure 4:
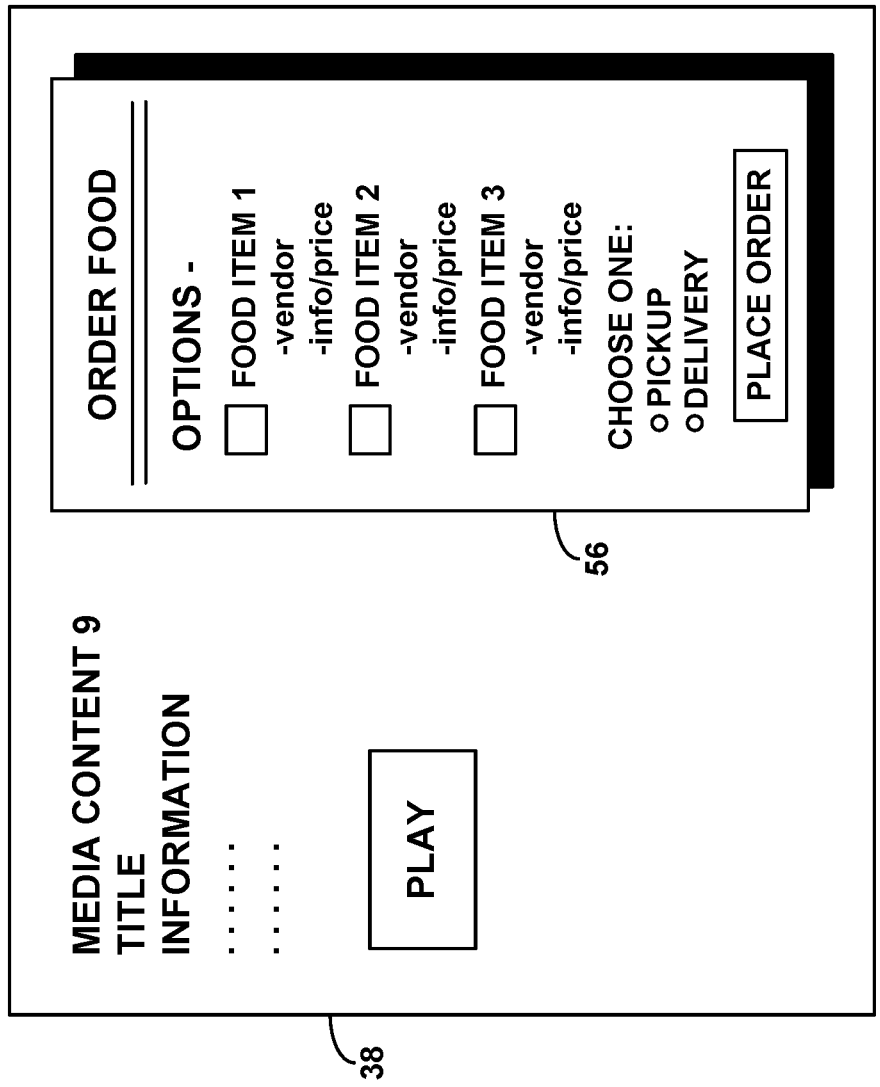
FIG. 4 is a simplified illustration of an example food-ordering prompt presented in connection with a media-play prompt.

FIG. 4 illustrates how the resulting GUI could appear in an example implementation, where a food-ordering prompt 56 is added as an overlay to the media-play prompt GUI 38. The example food-ordering prompt shows three identified food options with respective checkboxes, along with associated food vendor, information, and pricing information per food option, and the prompt then provides radio buttons for the user to select either pickup or delivery and provides a PLACE ORDER button that the user could engage in order to place an order for one or more selected food options for pickup or delivery. In line with the discussion above, the control server 26 could have selected these three example food-ordering options based on consideration of one or more characteristics of media-content item #9 that is the subject of the example media-play-prompt GUI 38. Further, numerous other food-ordering-prompt GUIs could be possible as well.

In operation, the control server 26 might generate a new version of the media-play-prompt GUI that incorporates the food-ordering prompt and then provide that new GUI to the media player 22 for presentation to the user, or the control server 26 may provide the media player 22 with just the add-on food-ordering prompt for the media player 22 to superimpose on its presentation of the media-play-prompt GUI. Note also that the act of presenting the food-ordering prompt in conjunction with the media-play prompt is just one of various possible arrangements for presenting the food-ordering prompt in response to determining that the media presentation system will soon begin playing the media-content item.

As another example, as indicated above, the media presentation system could automatically time presentation of the food-ordering prompt to occur at an opportune time during its presentation of the media-content item, based on consideration of content of the media-content item. For instance, if the media-content item includes a logical breakpoint such as an intermission, a commercial break, or a point where the media content transitions from one content segment, episode, chapter, storyline, the like to another, or where there is a lull in action, among other examples, the media presentation device could determine the time of that logical breakpoint and could responsively present the food-ordering prompt at that determined time.

To facilitate this, the media metadata 30 could include respectively for each media-content item a record of timestamps of such logical breakpoints, indicating when within the media-content item each such logical breakpoint occurs. These logical breakpoints could be designated by a producer of the respective media-content items, among other possibilities, and stored in the media metadata 30 for reference. Before or when the media presentation system is presenting a given media-content item to the user, the control server 26 could therefore refer to the media metadata 30 or other such predefined information regarding the media-content item to determine when a logical breakpoint will occur in playout of the media-content item. And the control server 26 could then present the food-ordering prompt at the determined time of the logical breakpoint.

Further, the media presentation system could automatically pause presentation of the media-content item at the determined breakpoint and, with the media content paused, present the food-ordering prompt and receive user response to the prompt before then restarting playout of the media-content item. For instance, at or in advance of the determined breakpoint, the control server 26 could transmit to the media player 22 a control signal that provides the media player 22 with the food-ordering prompt and that also specifies the time point (e.g., frame timestamp) of the breakpoint and directs and thus causes the media player 22 to pause presentation of the media-content item at that time point and, in its place to present the food-ordering prompt and to await user response to the prompt before resuming presentation of the media-content item.

As yet another example, as noted above, the media presentation system could schedule delivery or pickup of the ordered food to occur at an opportune time that the media presentation system determines in relation to presentation of the media-content item. For instance, the media presentation system could use timing of presentation of the media-content item as a basis to determine when pickup or delivery of the food order should occur, and the media presentation system could communicate the determined pickup or delivery time to an associated food vendor, to arrange for pickup or delivery of the food at that time.

In practice, for instance, the media presentation system could time delivery or pickup of the ordered food to occur upon conclusion of presentation of the media-content item, so that the user could conveniently eat after watching the media-content item.

To do so in an example implementation, the control server 26 could refer to the data indicating a remaining streaming or presentation duration of the media-content item, or indicating the full duration of the media-content item if presentation is about to begin, and the control server 26 could predict, based on that data and considering the current time of day, what time of day presentation of the media-content item will likely finish. For instance, the control server 26 could add the remaining media content duration to the current time of day to predict the media-content end time of day. And the control server 26 could then schedule delivery or pickup of the ordered food to occur at or in relation to that predicted end time.

For delivery of the ordered food, the control server 26 could schedule the delivery to occur at or around the predicated end time, so that the food could conveniently arrive for the user around when presentation of the media-content item ends.

Whereas, for pickup of the ordered food, the control server 26 could calculate a travel time from the user's location to the location of a food vendor from which the food is being ordered and could determine and schedule a pickup time that is that calculated travel time after the predicted conclusion of the media-content item, so that the user or another party could leave from the user's location to pick up the food order when playout of the media-content item ends and could arrive at the food vendor for pickup at around the scheduled pickup time. To facilitate calculating this travel time, the control server 26 could refer to the user-profile data 32 to determine a location of the media player 22 and thus the user 20, the control server 26 could refer to the vendor/food data 50 to determine a location of the food vendor, and the control server 26 could query a geo-mapping server 58 to determine a vehicle travel time from the user location to the vendor location.

Given its determination of the delivery or pickup time for the food order, the control server 26 could include in its API submission to the food-ordering clearinghouse an indication of the pickup or delivery time for the food order. Further, if the predicted end time of the media-content item changes, such as because presentation of the media-content item starts later than expected or gets paused, the control server 26 could determine and update the delivery or pickup time accordingly.

Alternatively, the media presentation system could time delivery or pickup of the ordered food to occur at or around an opportune breakpoint during presentation of the media-content item, such as at or around one of the breakpoints noted above for instance. Here, for instance, the control server 26 could determine as noted above what time such a breakpoint would occur during presentation of the media-content item, and the control server 26 could schedule the delivery or pickup of the food order to occur at or around that determined breakpoint time.

For delivery, the control server 26 could schedule the delivery to occur at a time slightly before the determined breakpoint, and the media presentation system could present to the user a delivery notification at the determined breakpoint. For instance, the control server 26 could provide to the media player 22 a GUI or other information indicating delivery of the food to the user and could direct and thus cause the media player 22 to output that information for presentation by the media presentation device 18 at the determined breakpoint. In practice, the control server 26 may require as a condition precedent for doing this that the food actually have been delivered to the user by that time. For instance, upon delivery of the food to the user, the food-ordering clearinghouse 46 could signal to the control server 26, and the control server 26 could responsively signal to the media players 22 to facilitate presentation of the delivery notification to the user.

Further, alternatively, if delivery to the user happens to occur at a time other than a determined breakpoint during presentation of the media-content item, the control server 26 may receive an associated signal from the food-ordering clearinghouse 46 and may likewise signal to the media player 22 but may direct and thus cause the media player 22 to output a smaller, less-obtrusive pop-up delivery notification superimposed over the media-content item being presented, perhaps in a lower corner or edge of video frames of the media-content item, among other possibilities.

Whereas, for pickup at a determined breakpoint, the control server 26 could determine the user's travel time to the food vendor as noted above, the control server 26 could schedule pickup to occur that calculated travel time after the determined breakpoint, and the control serer 26 could cause presentation to the user of an associated notification at the determined breakpoint, to trigger the user leaving to pick up the food order. For instance, control server 26 could provide to the media player 22 a GUI or other information indicating that it is time for the user to leave for pickup of the food order and could direct and thus cause the media player 22 to output that information for presentation by the media presentation device 18 at the determined breakpoint. Further, the media player 22 could pause playout of the media-content item at that breakpoint as well, to then present the pickup notification and to allow the user to leave to pick up the food order and could later resume playout of the media-content item upon user request.

Still alternatively, when presenting the food-ordering prompt and/or when the user has selected one or more food options to order, the media presentation system could present various options for delivery or pickup time. For instance, the control server 26 could predict both the time of an optimal breakpoint in the media-content item and the end time of the media-content item, and the control server 26 could provide to the media player 22 for presentation to the user a prompt for the user to select from those two times, among other possibilities. Further, as noted above, the media presentation system could prompt the user to select between delivery and pickup. The control server 26 could thus receive user input responsive to these or other such prompts and accordingly place the food order on behalf of the user.

As yet another example, the media presentation system could time its presentation of the food-ordering prompt in the first place based on data indicating when other users have place food orders in relation to presentation of the media-content item. For instance, the control server 26 could predict, based on past experience and/or other data, when in relation to presentation of the media-content item the user will want to eat, also taking into account the current time of day and typical meal or other eating times.

To facilitate this, in an example implementation, the control server 26 could maintain or otherwise have access to data that indicates for each of various users times of day when the user ordered food and times of day when the user has received presentation of particular media content. And the control server 26 could use user-identification information as a basis to map food-ordering times with content-presentation times, so as to establish statistical correlations between food ordering times and media-presentation times, perhaps further keyed to times of day such as proximity to meal times or the like.

In an example implementation, this data might establish that users tend to order food at or around a specific breakpoint in a particular media-content item and/or upon conclusion of presentation of that media-content item. When the media presentation system is presenting or will present that media-content item to user 20, the control server 26 could thus beneficially make use of this information as a basis to arrange for presentation of the food-ordering prompt to the user at a time when users have tended to order food in relation to presentation of that media-content item.

Further, the control server 26 could use a similar analysis a basis to determine which food options to present to the user in the food-ordering prompt. For instance, the control server 26 could refer to data indicating what food options other users have tended to order in relation to presentation of the media-content item, and the control server 26 could include in the food-ordering prompt to the user one or more food options that others have so tended to order.

The media presentation system could also take into account how long it will take one or more food vendors to prepare food that would be offered in the food-ordering prompt, as a further basis to determine when to present the food-ordering prompt or which food items to include in the food-ordering prompt.

For instance, if the control server 26 has predicted when the user would likely desire delivery or pickup of ordered food in relation to presentation of the media-content item and has determined which food items to include in the food-ordering prompt, the control server 26 could determine the food-preparation time respectively for each of those food items, the control server 26 could determine which of the food items has the greatest food-preparation time, and the control server 26 could arrange for presentation of the food-ordering prompt to the user at least that food item's food-preparation time in advance of the predicted delivery or pickup time, also accounting for travel time if appropriate.

Alternatively, if the control server 26 has predicted when the user would likely desire delivery or pickup of ordered food in relation to presentation of the media-content item and has determined when to present the food-ordering prompt to the user in relation to presentation of the media-content item, the control server 26 could likewise use food-preparation time as a basis to determine which food items to list in the food-ordering prompt. For instance, for pickup, the control server 26 could compute the duration from the food-ordering-prompting time to the pickup time, and the control server 26 could then select to include in the food-ordering prompt food items that have food-preparation times less than or equal to that computed duration. And for delivery, the control server 26 could compute the duration from the food-ordering-prompting time to the food delivery time minus a predicted delivery travel time, and the control server 26 could then select to include in the food-ordering prompt food items that have food-preparation times less than equal to that computed duration.

With this implementation, the control server 26 could thus include in the food-ordering prompt just those foot items that the control server 26 predicts could be ready in time, excluding one or more food-ordering options from the prompt based on a prediction that they would not be ready in time. For instance, if the food-ordering prompt would be presented with relatively little time before the predicted delivery or pickup time, then the control server 26 may limit the food-ordering prompt to list fast-food restaurant options. Whereas, if the food-ordering prompt would be presented longer before the predicted delivery or pickup time, then the control server 26 may include in the food-ordering prompt various options that would take longer to prepare and be conveyed to the user.

By tailoring the time and/or content of the food-ordering prompt based on food-preparation time, the control server 26 could thus help to ensure that, regardless of which food item(s) the user decides to order in response to presentation of the food-ordering prompt, the user's food order would likely be prepared by the determined delivery or pickup time.

In an example implementation, the control server 26 may determine food preparation time respectively for various food items based on the vendor/food data 50. For instance, this data could indicate how busy respective food vendors are per time of day and respectively for various food items how long preparation of the food items tend to take. Weighing the food-preparation times by the vendor level of business, the control server 26 could thus predict likely food preparation times for various food items from various food vendors. Other examples could be possible as well.

While the above discussion has focused on placing food orders for delivery or pickup, note that similar principles could apply as well to ordering food for dine-in and/or making reservations for dining in a restaurant. For instance, the control server 26 could use the above-discussed principles to present to the user a prompt for the user to select dining reservation options to dine at a restaurant after presentation of the media-content item. Here, for example, the control server 26 may predict the time when presentation of the media-content item would end, the control server may refer to a restaurant-reservation system (not shown) to select dine-in reservation options available at or around the predicted media-content end time, also accounting for travel time, and may present the user with a prompt for the user to select and make such a dining reservation. Further, the control server 26 may also use a similar process to enable the user to request advanced preparation of food, such as a pizza, that may take long to prepare, to be ready at the time of the reservation.

Other variations from the principles discussed above are possible as well. For example, although the above discussion focuses on operations carried out by the control server 26, similar functions could be carried out by one or more other network servers associated with the media provider and/or by the media player 22 or other customer-premises equipment. Further, although the above discussion refers to use of the food-ordering clearinghouse 46, other implementations could provide more direct communication between the media presentation system and various food vendors. Still further, although the above discussion refers to media content presentation on a display screen, similar principles could apply with respect to audio-only media content and to other forms of audio content or content-presentation mechanisms.

Further, where the disclosure refers to the media presentation system presenting notifications, content, or other items, that could involve the media presentation system directly or indirectly presenting the items, such as a client-side device doing the presentation or a server-side device engaging in signaling to cause the presentation to occur. Likewise, where the disclosure refers to the media presentation system receiving one or more items or taking other such action, that could involve directly or indirectly taking those actions.

Figure 5:
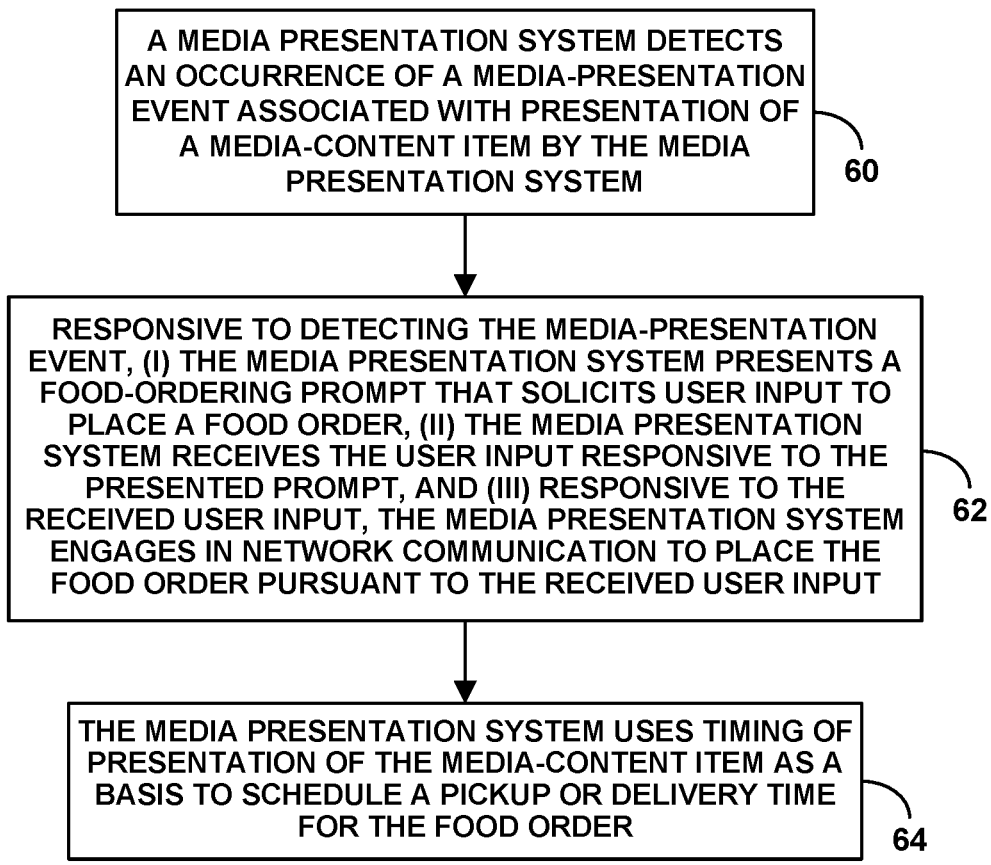
FIG. 5 is a flow chart depicting a method that can be carried out in accordance with the disclosure.

FIG. 5 is a flow chart depicting a method that can be carried out in accordance with the present disclosure for food-order processing based on timing of media-content presentation. As shown in FIG. 5, at block 60, the method includes a media presentation system detecting an occurrence of a media-presentation event associated with presentation of a media-content item by the media presentation system. Further, at block 62, the method includes, responsive to detecting the media-presentation event, (i) the media presentation system presenting a food-ordering prompt that solicits user input to place a food order, (ii) the media presentation system receiving the user input responsive to the presented prompt, and (iii) responsive to the received user input, the media presentation system engaging in network communication to place the food order pursuant to the received user input. And still further, at block 64, the method includes the media presentation system using timing of presentation of the media-content item as a basis to schedule a pickup or delivery time for the food order.

In line with the discussion above, the act of detecting the media-presentation event could involve detecting that the media presentation system is presenting a startup prompt that prompts for user input to start presentation of the media-content item, and the act of presenting the food-ordering prompt could occur while the media presentation system is presenting the startup prompt. Further, as discussed above, the act of detecting the media-presentation event could involve detecting occurrence of a breakpoint during presentation of the media-content item by the media presentation system (e.g., detecting current occurrence of that breakpoint and/or predicting when that breakpoint will occur), and the act of presenting the food-ordering prompt occurs at the detected breakpoint.

In addition, as discussed above, the method could involve the media presentation system determining a subject matter of the media-content item, and the media presentation system using the determined subject matter of the media-content item as a basis to select and include one or more food-ordering options in the food-ordering prompt. And further, the method could include the media presentation system using records of past food ordering in relation to media-content presentation as a basis to select and include one or more food-ordering options in the food-ordering prompt.

Yet further, the method could include the media presentation system using the timing of presentation of the media content as a basis to predict the pickup or delivery time, and the media presentation system could use the predicted pickup or delivery time as a basis to select and include in the food-ordering prompt one or more food-ordering options that could be picked up or delivered by the predicted pickup or delivery time.

In addition, the act of using timing of presentation of the media-content item as a basis to schedule the pickup or delivery time for the food order could involve the media presentation system predicting when presentation of the media-content item will end and, based on the predicting of when presentation of the media-content item will end, the media presentation system scheduling the pickup or delivery to occur upon ending of presentation of the media-content item. Further, for pickup of the food order from a food vendor, the act of scheduling the pickup to occur upon the predicted ending of presentation of the media-content item could involve (i) determining a travel time for travel from a location where the media presentation system presents the media-content item to a location of the food vendor and (ii) based on the determining of the travel time, scheduling the pickup time to be at least the determined travel time after the predicted ending of presentation of the media-content item.

Still further, the act of using timing of presentation of the media-content item as a basis to schedule the pickup or delivery time for the food order could involve (i) the media presentation system predicting, based on data regarding the media-content item, when a breakpoint in the media-content item will occur during presentation of the media-content item and (ii) based on the predicting of when the breakpoint will occur in the media-content item during presentation of the media-content item, the media presentation system scheduling the pickup or delivery to occur at a time based on the predicted breakpoint.

For instance, for pickup of the food order from a food vendor, the act of scheduling the pickup to occur at the time based on the predicted breakpoint could involve (i) determining a travel time for travel from a location at which the media presentation system presents the media-content item to a location of the food vendor and (ii) based on the determining of the travel time, scheduling the pickup time to be at least the determined travel time after the predicted breakpoint. In addition, as discussed above, the method could include the media presentation system presenting at the predicted breakpoint a notification to leave for pickup of the food order. Whereas, for delivery of the food order, the act of scheduling the delivery to occur at the time based on the predicted breakpoint could involve scheduling the delivery to occur at a delivery time that is a predefined duration before the predicted breakpoint, to help ensure receipt of the food order by the predicted breakpoint. In addition, the method could also involve the media presentation system presenting at the predicted breakpoint a notification of delivery of the food order.

Yet further, the act of the media presentation system engaging in network communication by to place the food order pursuant to the received user input could involve the media presentation system using an API to interact directly or indirectly with one or more food vendors to place the food order, such as by interacting with a food-ordering clearinghouse as discussed above for instance. And as noted above, the media presentation system could use pre-stored user-profile data as a basis to process payment for the food order.

Figure 6:
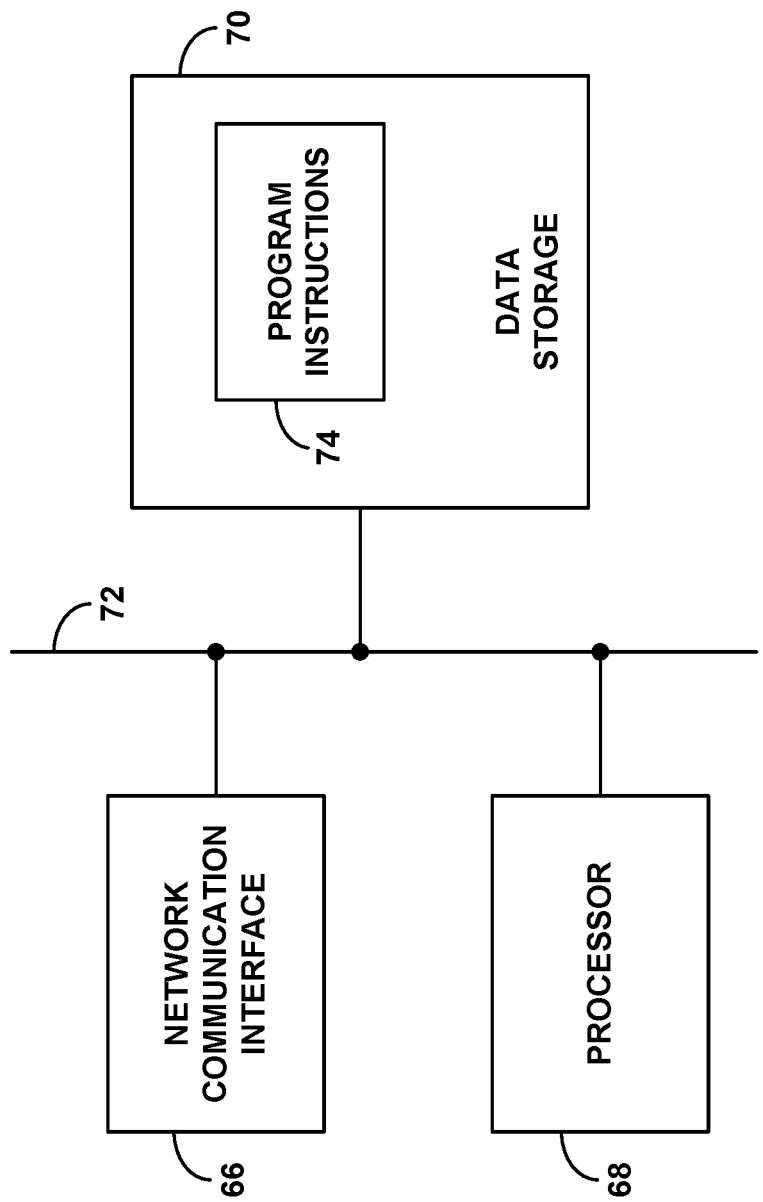
FIG. 6 is a simplified block diagram of an example system operable in accordance with the disclosure.

FIG. 6 is next a simplified block diagram of an example system operable in accordance with the present disclosure. This system could represent control server 26 as described above and/or one or more other components of or associated with a media presentation system, among other possibilities. As shown in FIG. 6, the example system includes a network communication interface 66, a processor 68, and non-transitory data storage 70, any or all of which could be integrated together or, as shown, communicatively linked together by a system bus, network, or other connection mechanism 72.

The network communication interface 66 could comprise one or more physical network connection mechanisms to facilitate communication on a network, and/or for engaging in direct or networked communication with one or more other local or remote entities. As such, the network communication interface 66 could comprise a wireless or wired Ethernet interface or other type of network interface, for engaging in IP communication and/or other type of network communication.

Further, the processor 68 could comprise one or more general purpose processors (e.g., microprocessors) and/or one or more specialized processors (e.g., application specific integrated circuits). And the non-transitory data storage 70 could comprise one or more volatile and/or non-volatile storage components, such as optical, magnetic, or flash storage.

As shown, the data storage 70 of the example system could further store program instructions 74, which could be executable by the processor 68 to carry out various operations described herein. For instance, the operations could include (a) detecting an occurrence of a media-presentation event associated with presentation of a media-content item by the media presentation system, (b) responsive to detecting the media-presentation event, (i) presenting a food-ordering prompt that solicits user input to place a food order, (ii) receiving the user input responsive to the presented prompt, and (iii) responsive to the received user input, engaging in network communication through the network communication interface to place the food order pursuant to the received user input, and (c) using timing of presentation of the media-content item as a basis to schedule a pickup or delivery time for the food order.

Various features described herein could be implemented in this context as well, and vice versa.

Figure 7:
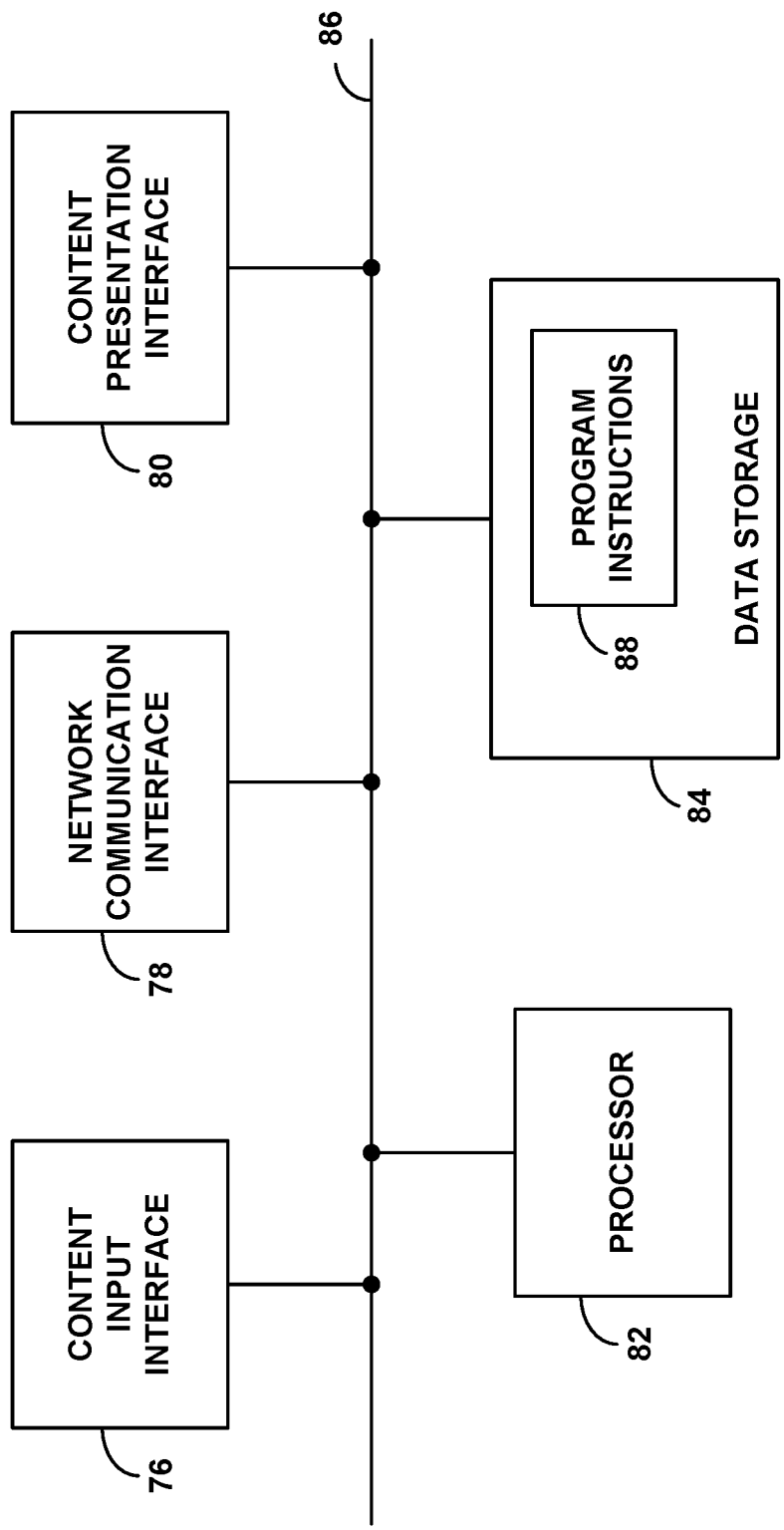
FIG. 7 is a simplified block diagram of an example content presentation device operable in accordance with the disclosure.

Finally, FIG. 7 is a simplified block diagram of example customer-premises equipment, including aspects of a media player and media presentation device as discussed above. As shown in FIG. 7, the example customer-premises equipment includes a content input interface 76, a network communication interface 78, a content presentation interface 80, a processor 82, and non-transitory data storage 84, any or all of which could be integrated together or, as shown, communicatively linked together by a system bus, network, or other connection mechanism 86.

Content input interface 76 could comprise a physical communication interface for receiving media content to be presented by the customer-premises equipment. As such, the content input interface 76 could include one or more wired and/or wireless interfaces for establishing communication with and receiving media content in analog or digital form from a media source. Network communication interface 78, which could be separate from or the same interface as the content input interface 76, could comprise a physical network connection mechanism to facilitate communication on a network, and/or for engaging in direct or networked communication with one or more other local or remote entities. These interfaces could comprise a wireless or wired Ethernet interface or other type of network interface, for engaging in IP communication and/or other type of network communication, among other possibilities.

Content presentation interface 80 could then comprise one or more components to facilitate presentation of the received media content. By way of example, the content presentation interface 80 could comprise a user interface such as a display screen and/or a loudspeaker, as well as one or more drivers or other components for processing the received media content to facilitate presentation of the content on the user interface.

Processor 82 could then comprise one or more general purpose processors (e.g., microprocessors) and/or one or more specialized processors (e.g., application specific integrated circuits). And non-transitory data storage 82 could comprise one or more volatile and/or non-volatile storage components, such as optical, magnetic, or flash storage. Further, as shown, data storage 84 could store stores program instructions 88, which could be executable by processor 80 to carry out various operations described here.

Various features described herein could be implemented in this context as well, and vice versa.

Further, the present disclosure also contemplates one or more non-transitory computer readable media encoded with, storing, or otherwise embodying program instructions executable by one or more processors to carry out various operations as described herein.

Exemplary embodiments have been described above. Those skilled in the art will understand, however, that changes and modifications may be made to these embodiments without departing from the true scope and spirit of the invention.

What is claimed is:

1. A method comprising:
    receiving and presenting by a media player of a media-presentation system, at a media-presentation location, a media-content item being streamed over a network to the media player from a media server of the media-presentation system, wherein the media-presentation system further includes a control server for controlling streaming of the media-content item by the media server; and
    before ending of the presentation of the media-content item (i) predicting by the media-presentation system a media end time defining when the presentation of the media content by the media player will end, (ii) identifying by the media-presentation system a breakpoint in the media-content item that will occur before the predicted end time, (iii) selecting by the media-presentation system one or more items available to order, the selecting of each item of the one or more items being based at least on the item, if ordered at the identified breakpoint, being deliverable to the media-presentation location at the predicted media end time, and (iv) based on the identifying and the selecting, automatically transmitting by the control server to the media player a control signal that specifies the identified breakpoint and that causes (a) pausing by the media player at the identified breakpoint the presenting of the media-content item and (b) presenting by the media player at the identified breakpoint an order prompt indicating the one or more selected items as being available to order,
    wherein the control server maintains context data indicating state of presentation of the media-content item by the media player at the media-presentation location, including an indication of remaining streaming duration of the media-content item, and wherein predicting when the presentation of the media-content item at the media-presentation location will end comprises the control server (i) referring to the context data to determine the remaining streaming duration of the media-content item and (ii) offsetting a current time of day by the determined remaining streaming duration.

2. The method of claim 1, wherein the identified breakpoint comprises at least one of an intermission, a commercial break, a time when the media-content item transitions from one content segment, episode, chapter, storyline to another, or a time when there is lull in action in the media-content item.

3. The method of claim 1, further comprising, as a basis for the selecting each of the one or more items, determining by the media-presentation system that, if the item is ordered at the identified breakpoint, the item will be deliverable to the media-presentation location at the predicted media end time.

4. The method of claim 1, further comprising receiving by the media-presentation system, in response to the presented order prompt, an order for at least one of the one or more items, and responsively processing by the media-presentation system the order.

5. The method of claim 4, further comprising:
    determining by the media-presentation system that presentation of the media-content item will end later than predicted; and
    responsive to determining by the media-presentation system that presentation of the media-content item will end later than predicted, updating by the media-presentation system the order.

6. The method of claim 4, wherein processing the order comprises processing the order through an application programming interface.

7. The method of claim 1, wherein each of the one or more items comprises a food item.

8. The method of claim 1, wherein selecting the one or more items is further based on a correlation with a subject matter of the media-content item.

9. The method of claim 1, wherein the media-content item is selected from the group consisting of a movie, a television show, and video game.

10. A media-presentation system comprising:
    a control server and media server each in network communication with a media player that is at a media-presentation location, wherein the media server is configured to stream to the media player a media-content item for presentation by the media player at the media-presentation location, and wherein the control server is configured to control streaming of the media-content item by the media server,
    wherein the control server is configured to maintain context data indicating state of presentation of the media-content item by the media player at the media-presentation location, including an indication of remaining streaming duration of the media-content item,
    wherein the control server comprises one or more processors, non-transitory data storage, and program instructions stored in the non-transitory data storage and executable by the one or more processors to carry out operations including:
        before ending of the presentation of the media-content item (i) predicting a media end time defining when the presentation of the media content by the media player will end, (ii) identifying a breakpoint in the media-content item that will occur before the predicted end time, (iii) selecting one or more items available to order, the selecting of each item of the one or more items being based at least on the item, if ordered at the identified breakpoint, being deliverable to the media-presentation location at the predicted media end time, and (iv) based on the identifying and the selecting, automatically transmitting to the media player a control signal that specifies the identified breakpoint and that causes (a) the media player to pause at the identified breakpoint the presenting of the media-content item and (b) to present at the identified breakpoint an order prompt indicating the one or more selected items as being available to order, and
        wherein predicting when the presentation of the media-content item at the media-presentation location will end comprises the control server (i) referring to the context data to determine the remaining streaming duration of the media-content item and (ii) offsetting a current time of day by the determined remaining streaming duration.

11. The media-presentation system of claim 10, wherein the identified breakpoint comprises at least one of an intermission, a commercial break, a time when the media-content item transitions from one content segment, episode, chapter, storyline to another, or a time when there is lull in action in the media-content item.

12. The media-presentation system of claim 10, wherein the operations additionally include, as a basis for the selecting each of the one or more items, determining that, if the item is ordered at the identified breakpoint, the item will be deliverable to the media-presentation location at the predicted media end time.

13. The media-presentation system of claim 10, wherein the operations additionally include receiving, in response to the presented order prompt, an order for at least one of the one or more items, and responsively processing the order.

14. The media-presentation system of claim 13, wherein the operations additionally include:
   determining that presentation of the media-content item will end later than predicted; and
   responsive to determining that presentation of the media-content item will end later than predicted, updating the order.

15. The media-presentation system of claim 13, wherein processing the order comprises processing the order through an application programming interface.

16. The media-presentation system of claim 10, wherein each of the one or more items comprises a food item.

17. The media-presentation system of claim 10, wherein selecting the one or more items is further based on a correlation with a subject matter of the media-content item.

18. The media-presentation system of claim 10, wherein the media-content item is selected from the group consisting of a movie, a television show, and video game.

19. Non-transitory data storage having stored thereon program instructions executable by one or more processors to cause a control server of a media-presentation system to carry out operations when a media player of the media-presentation system is receiving and presenting, at a media-presentation location, a media-content item being streamed over a network to the media player from a media server of the media-presentation system, the operations comprising:
   before ending of the presentation of the media-content item (i) predicting by the media-presentation system a media end time defining when the presentation of the media content by the media player will end, (ii) identifying by the media-presentation system a breakpoint in the media-content item that will occur before the predicted end time, (iii) selecting by the media-presentation system one or more items available to order, the selecting of each item of the one or more items being based at least on the item, if ordered at the identified breakpoint, being deliverable to the media-presentation location at the predicted media end time, and (iv) based on the identifying and the selecting, automatically transmitting by the control server to the media player a control signal that specifies the identified breakpoint and that causes (a) pausing by the media player at the identified breakpoint the presenting of the media-content item and (b) presenting by the media player at the identified breakpoint an order prompt indicating the one or more selected items as being available to order,
   wherein the media-presentation system further includes a control server for controlling streaming of the media-content item by the media server, wherein the control server maintains context data indicating state of presentation of the media-content item by the media player at the media-presentation location, including an indication of remaining streaming duration of the media-content item, and wherein predicting when the presentation of the media-content item at the media-presentation location will end comprises the control server (i) referring to the context data to determine the remaining streaming duration of the media-content item and (ii) offsetting a current time of day by the determined remaining streaming duration.

20. The non-transitory data storage of claim 19, wherein the operations additionally include, as a basis for the selecting each of the one or more items, determining that, if the item is ordered at the identified breakpoint, the item will be deliverable to the media-presentation location at the predicted media end time.

* * * * *